United States Patent
Ogawa

(10) Patent No.: US 7,131,682 B2
(45) Date of Patent: Nov. 7, 2006

(54) VEHICLE SUN VISORS HAVING MIRRORS

(75) Inventor: Hiroto Ogawa, Toyota (JP)

(73) Assignees: Kyowa Sangyo Co., Ltd., Aichi-ken (JP); Shinwa Seiko Co., Ltd., Aichi-ken (JP)

( * ) Notice: Subject to any disclaimer, the term of this patent is extended or adjusted under 35 U.S.C. 154(b) by 0 days.

(21) Appl. No.: 11/265,733

(22) Filed: Nov. 2, 2005

(65) Prior Publication Data

US 2006/0091692 A1    May 4, 2006

(30) Foreign Application Priority Data

Nov. 2, 2004    (JP)    ............................. 2004-319372

(51) Int. Cl.
*B60J 3/00*    (2006.01)
(52) U.S. Cl. .................... 296/97.2; 296/97.8; 296/1.11
(58) Field of Classification Search ............... 296/1.11, 296/97.1, 97.2, 97.3, 97.5, 97.6, 97.8
See application file for complete search history.

(56) References Cited

U.S. PATENT DOCUMENTS

| | | | | |
|---|---|---|---|---|
| 1,493,609 A | * | 5/1924 | Dailey | ........................ 296/97.5 |
| 2,755,126 A | * | 7/1956 | Ludlow | ....................... 296/97.6 |
| 2,894,576 A | * | 7/1959 | Williams | .................... 296/97.6 |
| 2,915,937 A | * | 12/1959 | Winchell | .................... 296/97.2 |
| 3,158,396 A | * | 11/1964 | Berger | ........................ 296/97.6 |
| 3,428,360 A | * | 2/1969 | Honor, Sr. | ................... 296/97.6 |
| 4,624,499 A | * | 11/1986 | Flowerday | ................. 296/97.5 |
| 4,976,486 A | * | 12/1990 | Rifaat | ........................ 296/97.8 |
| 5,641,191 A | * | 6/1997 | Jia | ............................. 296/97.6 |
| 2001/0040384 A1 | * | 11/2001 | Graham et al. | ............ 296/97.1 |
| 2005/0134078 A1 | * | 6/2005 | Iwatsuka et al. | ........... 296/97.2 |

FOREIGN PATENT DOCUMENTS

| | | |
|---|---|---|
| JP | 2002-012029 | 1/2002 |
| JP | 2003-182362 | 7/2003 |

* cited by examiner

*Primary Examiner*—Jason Morrow
(74) *Attorney, Agent, or Firm*—Conley Rose, P.C.

(57) ABSTRACT

A vehicle sun visor has a bearing disposed at an upper corner portion of a visor body. A sight-through portion is defined in a lower region of the visor body in order to enable observation through the sight-through portion. The sight-through portion extends at least between an eye point on the visor body and a central point of the lower region of the visor body. A mirror assembly is movable between a usable position and a storage position without interacting with the sun visor bearing. The usable position is disposed on or proximate to the eye point. The storage position is disposed in the upper region of the visor body. The mirror assembly in the usable position and the storage position does not cover the central point of the lower region.

13 Claims, 6 Drawing Sheets

VEHICLE SUN VISORS HAVING MIRRORS

This application claims priority to Japanese patent application Ser. No. 2004-319372, the contents of which are incorporated herein by reference.

BACKGROUND OF THE INVENTION

1. Field of the Invention

The present invention relates to vehicle sun visors, and in particular to vehicle sun visors having a visor body, a support rod rotatably supporting the visor body, and a mirror mounted to the visor body.

2. Description of the Related Art

A variety of vehicle sun visors are known, such as the vehicle sun visors disclosed in Japanese Laid-Open Patent Publication Nos. 2002-12029 and 2003-182362. The vehicle sun visor disclosed in Japanese Laid-Open Patent Publication No. 2002-12029 has a mirror assembly mounted to a visor body. In general, a mirror assembly is disposed at an eye point on the visor body where the line of sight from the passenger's eyes intersects roughly perpendicular to the visor body, and which is below the bearing of the visor body, to which the support rod is rotatably mounted. Therefore, the passenger can catch sight of himself or herself in a mirror without needing to substantially change the position of his or her head. The vehicle sun visor disclosed in Japanese Laid-Open Patent Publication No. 2003-182362 has a sight-through portion formed on the visor body in order to enable the operator to look forward through the visor body.

If a sight-through portion is provided on the visor body in addition to a mirror assembly, the mirror assembly may shield the sight-through portion when the mirror assembly is preferably positioned at the eye point. In addition, because the visor body generally has a bearing for rotatably supporting the support rod, the bearing restricts the changing of the position of the mirror assembly.

SUMMARY OF THE INVENTION

It is accordingly an object of the present invention to teach improved techniques for enabling the positioning of a mirror assembly at an eye point while ensuring an effective sight-through region.

In one aspect of the present teachings, vehicle sun visors are taught that include a plate-shaped visor body, a support rod pivotally supporting the visor body, a mirror assembly mounted to the visor body, and a bearing disposed at an upper corner portion of the visor body and rotatably supporting the support rod. A sight-through portion is defined in a lower region of the visor body in order to enable forward vision through the sight-through portion. The sight-through portion extends at least between an eye point on the visor body and a central point of the lower region of the visor body. The eye point is positioned on the lower side of the bearing and is defined as a point on the visor body where the line of sight of a vehicle occupant (e.g., a driver or a passenger) intersects approximately perpendicular to the visor body. The mirror assembly is movable between a usable position and a storage position relative to the visor body without interacting with the bearing. The usable position is disposed on or in the vicinity of the eye point. The storage position is disposed on the upper region of the visor body. The mirror assembly in the usable position and in the storage position does not cover the central point of the lower region.

The effective region of the sight-through portion is a region through which the driver or the passenger can visually recognize traffic signals. Measurements taken by the inventor of the present invention have indicated that this effective region includes the central point of the lower region of the visor body. According to the present invention, the mirror assembly does not cover the central point at the usable position or the storage position. Therefore, the driver or the passenger can easily recognize the traffic signals at any position of the mirror assembly.

In addition, because the usable position of the mirror assembly locates the mirror assembly on the eye point, the driver or the passenger can see his or her face in the mirror without needing to substantially change the position of his or her head. Further, when the mirror assembly has moved to the storage position within the upper region of the visor body, the mirror assembly uncovers a sight-through region at the eye point. Therefore, the sight-through region can be effectively utilized. Furthermore, the mirror assembly may not interact with the sun visor bearing during the movement of the mirror assembly changing position.

In one embodiment, the visor body is pivotally mounted to the visor body. The sun visor further includes a positioning device that serves to hold the mirror assembly in a usable position and a storage position. The usability of the mirror assembly can be further improved with this arrangement.

In another embodiment, the visor body includes a plate-shaped primary body portion and a plate-shaped secondary body portion. The secondary body portion has a smaller size than the primary body portion and only covers an upper part of the primary body portion. The bearing is disposed between the primary body portion and the secondary body portion. The lower region of the visor body may be configured as a single layer structure comprising the primary body portion.

The lower region of the visor body can be configured to be relatively lightweight with this type of single layer structure arrangement. Because the support rod is mounted to the upper region of the visor body, the lower region (which has a lighter weight) is positioned at a distance away from the support rod. Therefore, the visor body can be pivoted about the support rod by only requiring the application of a small force. This enables an operator to easily change the position of the visor body, such as placing the visor body in the storage position along the vehicle cabin ceiling.

In a further embodiment, a storage space may be defined between the primary body portion and the secondary body portion in order to receive the mirror assembly in a storage position. Withdrawing the mirror assembly from the storage space moves the mirror assembly from the storage position to a usable position.

Therefore, in the storage position, the surface of the mirror of the mirror assembly can be covered and hidden. Thus, the primary body portion and the secondary body portion reliably protect the surface of the mirror from potential damage.

DETAILED DESCRIPTION OF THE INVENTION

Each of the additional features and teachings disclosed above and below may be utilized separately or in conjunction with other features and teachings to provide improved sun visors. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

(First Representative Embodiment)

Figure 1:
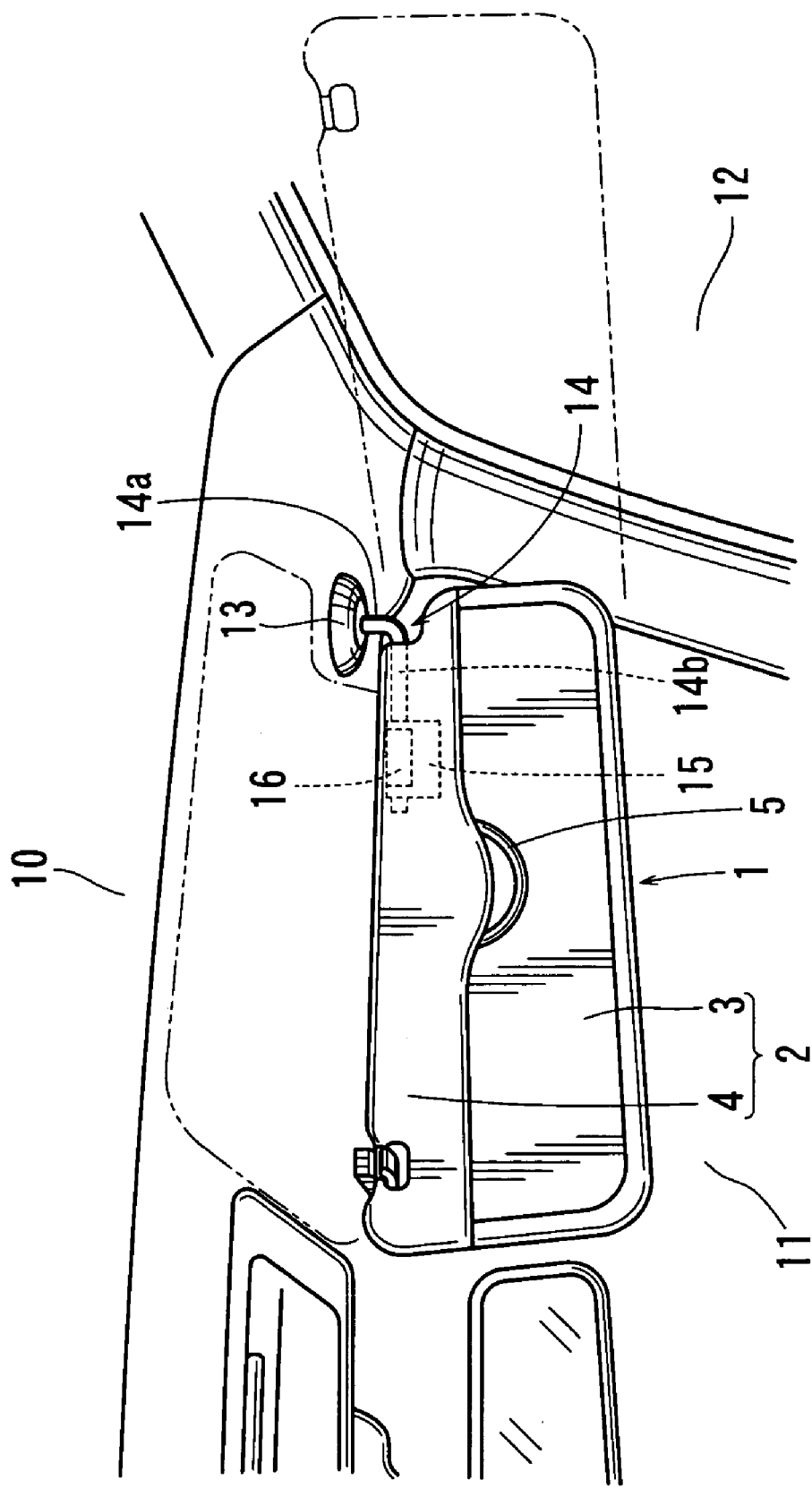
FIG. 1 is a perspective view of a vehicle sun visor according to a first representative embodiment as viewed from inside of a vehicle cabin.

A first representative embodiment will now be described with reference to FIGS. 1 to 8. As shown in FIG. 1, a representative vehicle sun visor 1 generally includes a substantially flat plate-like visor body 2 and a support rod 14 for rotatably supporting he visor body 2. A mirror assembly 5 is rotatably mounted to the visor body 2.

The support rod 14 has a substantially L-shaped configuration and includes a vertical rod portion 14a and a horizontal rod portion 14b. The vertical rod portion 14a is rotatably mounted to a vehicle cabin ceiling 10 via a bracket 13 so that the vertical rod portion 14a can be rotated about its own axis. The horizontal rod portion 14b is rotatably inserted into a bearing 15 disposed within the upper portion of the visor body 2. Therefore, the visor body 2 may be moved between a light-shielding position proximate to and along a windshield 11 and a storage position along the vehicle cabin ceiling 10 as the visor body 2 pivots about the axis of the horizontal rod portion 14b. In addition, the visor body 2 may be moved between a light-shielding position and a side position along the side glass 12 as the visor body 2 pivots about the axis of the vertical rod portion 14a.

Figure 4:
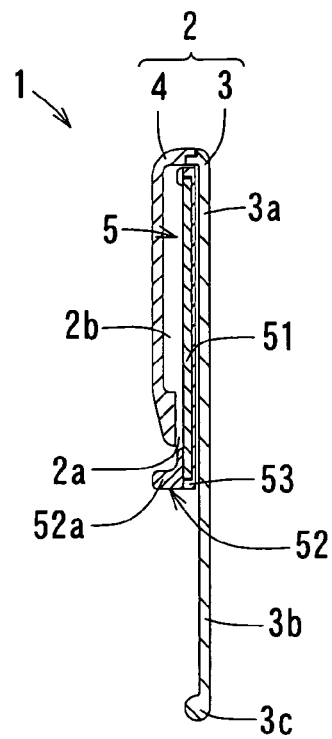
FIG. 4 is a cross-sectional view taken along line IV—IV in FIG. 2.

As shown in FIG. 4, the visor body 2 has a primary body portion 3 and a secondary body portion 4 that are formed as individual members, separately from each other, and respectively have substantially plate-shaped configurations. The primary body portion 3 and the secondary body portion 4 are fitted to each other so as to be formed into one piece. In the light-shielding position shown in FIG. 4, the upper portion of the visor body 2 has a double layer structure including the upper part of the primary body portion 3 and the secondary body portion 4, while the lower portion of the visor body 2 has a single layer structure including the lower part of the primary body portion 3. In addition, in the light-shielding position the secondary body portion 3 is positioned on the side of a passenger (not shown) of the primary body portion 4. Further, a lower light-transmission factor material is used to mold the secondary body portion 4 (such as a material having a light-transmission factor of about zero) than the material used for the primary body portion 3. Therefore, any element that is disposed within the upper region of the visor body 2, such as a bearing 15 that will be described later, may be covered and hidden by the secondary body portion 4.

Figure 2:
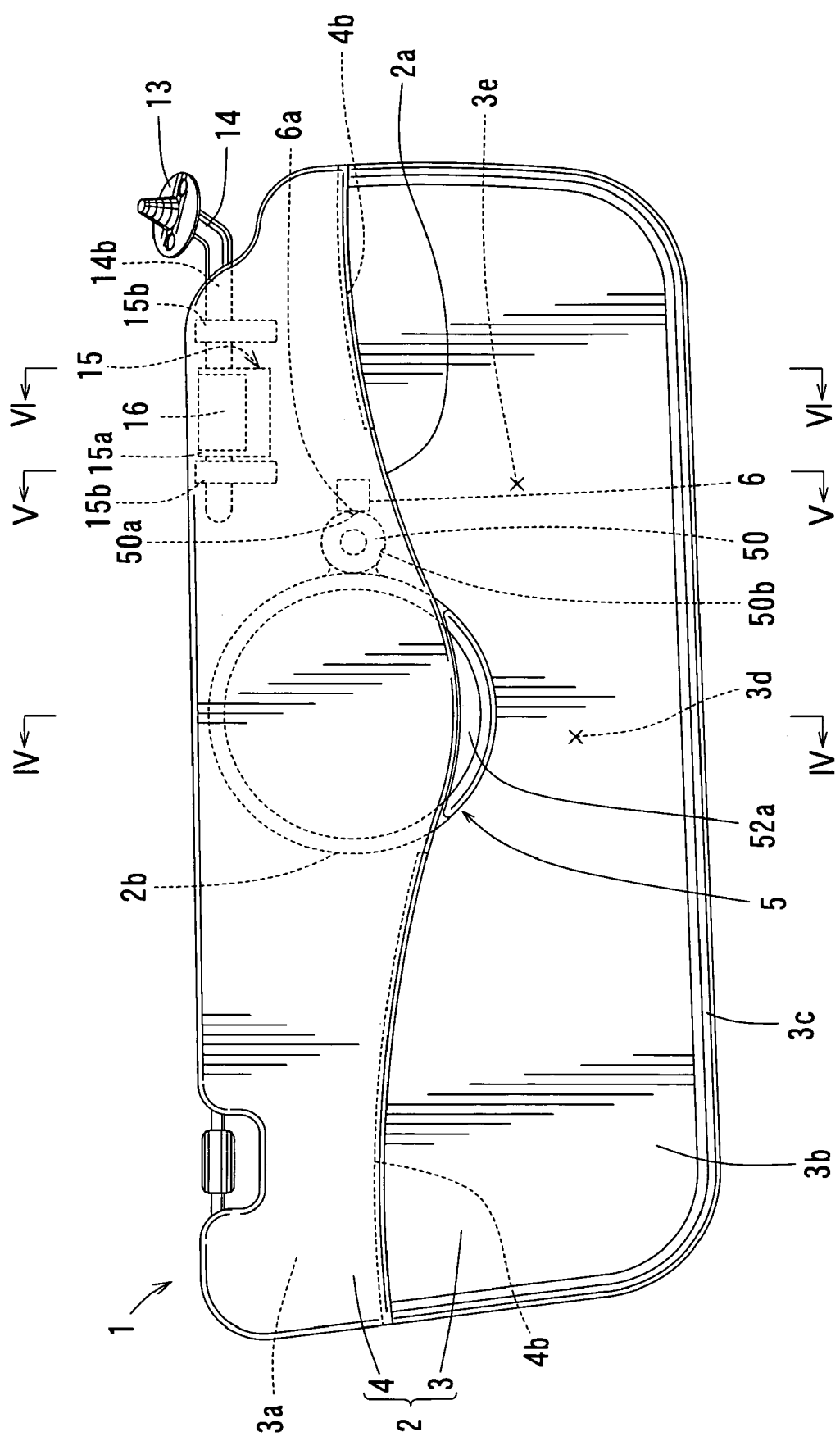
FIG. 2 is a front view of the vehicle sun visor.
Figure 5:
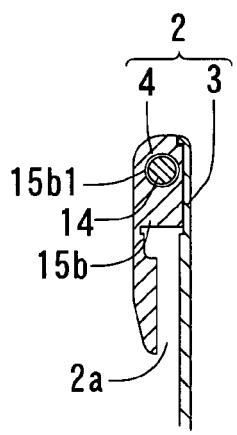
FIG. 5 is a partial cross-sectional view taken along line V—V in FIG. 2.
Figure 6:
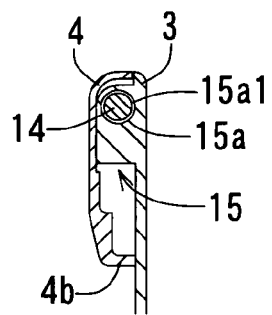
FIG. 6 is a partial cross-sectional view taken along line VI—VI in FIG. 2.

A shown in FIG. 2, the bearing 15 and a biasing member 16 are disposed within one of the corners (e.g., the right corner in this representative embodiment) of the upper portion of the visor body 2. The bearing member 15 has a primary bearing 15a and secondary bearings 15b. The primary bearing 15a is formed integrally with the primary body portion 3, as shown in FIG. 6. The secondary bearing 15b is formed integrally with the secondary body portion 4, as shown in FIG. 5. Insertion holes 15a1 (FIG. 6) and 15b1 (FIG. 5) are respectively formed in the primary bearing 15a and the secondary bearing 15b in order to slidably rotatably receive the support rod 14. As a result, the support rod 14 is rotatably supported by the primary bearing 15a and the secondary bearing 15b.

The biasing member 16 may be formed by a leaf spring and is mounted on the bearing 15 as shown in FIG. 2. The biasing member 16 is configured to have an inverted U-shaped cross-section in order to receive the support rod 14 therein. The biasing member 16 biases the support rod 14 in the rotational direction, so that the visor body 2 is urged towards a storage position along the vehicle cabin ceiling 10 and is resiliently held in the storage position (see top most double-dashed chain lines in FIG. 1).

Figure 3:
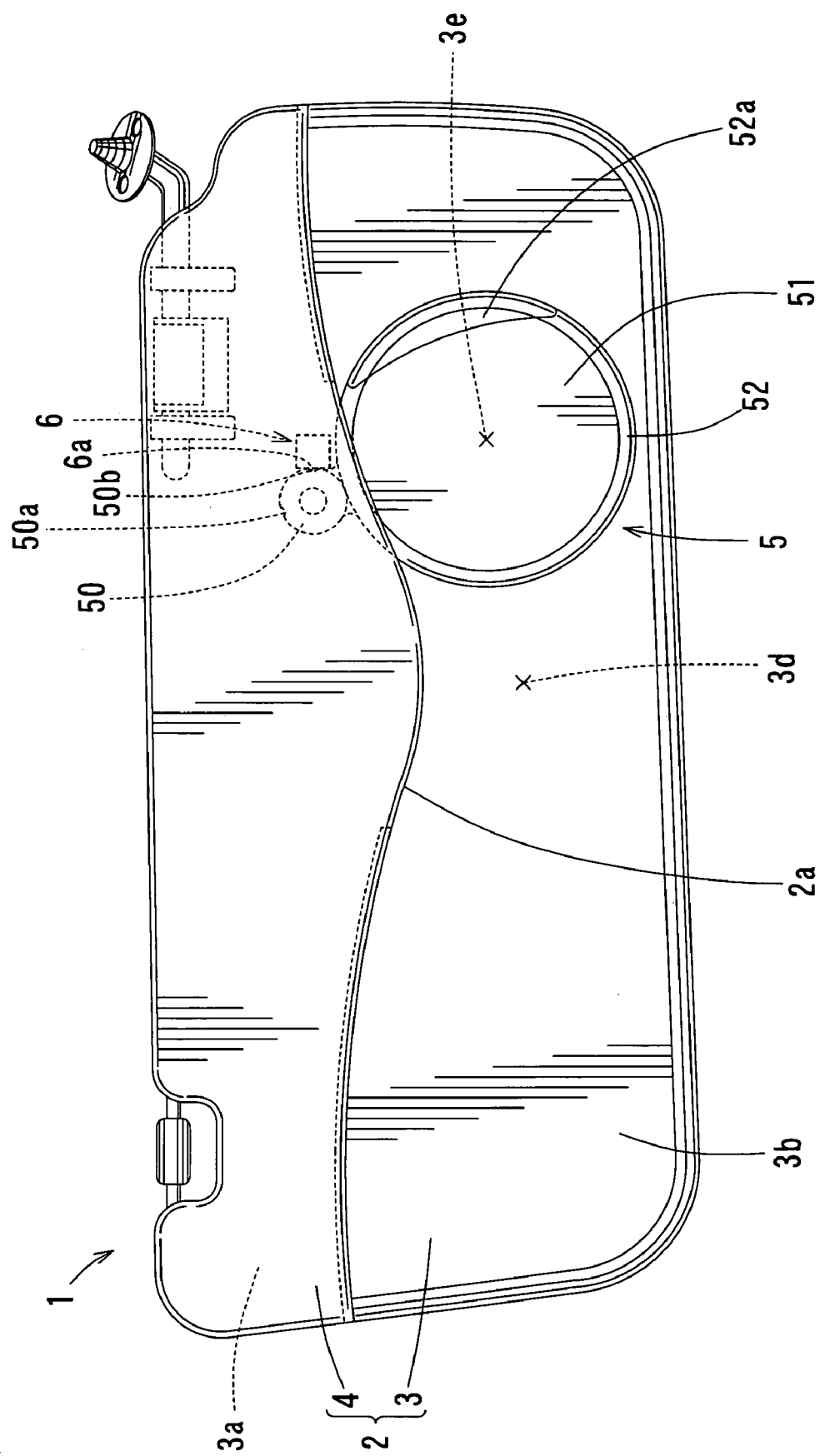
FIG. 3 is front view similar to FIG. 2 but showing a mirror assembly positioned in a usable position.

As shown in FIGS. 3 and 4, the mirror assembly 5 includes a mirror 51, a support base 53, a frame 52, and a rotary shaft 50. The support base 53 supports the mirror 51 from the backside. The frame 52 covers the outer circumferential edge of the mirror 51 in order to protect the mirror 51. The rotary shaft 50 is integrally formed with the support base 53. Alternatively, the rotary shaft 50 may be integrally formed with the frame 52. As shown in FIGS. 2 and 3, the rotary shaft 50 is disposed between the primary body portion 3 and the secondary body portion 4. In addition, the rotary shaft 50 has opposite ends that are respectively rotatably supported by the primary body portion 3 and the secondary body portion 4. Therefore, the mirror assembly 5 is pivotable relative to the visor body 2 about an axis defined by the rotary shaft 50.

The above arrangement of the mirror assembly 5 enables the mirror assembly 5 to pivot with respect to the visor body 2 between an upper position shown in FIG. 2 and a lower position shown in FIG. 3. In the upper position, the mirror assembly 5 is substantially disposed within a storage space 2b that is defined between the primary body portion 3 and the secondary body portion 4, as shown in FIGS. 2 and 4. Therefore, the upper position will also be hereinafter called the "storage position." In the lower position, the mirror assembly 5 is substantially withdrawn from the storage space 2b so that the passenger (in this example) can use the mirror 51. Therefore, this position will also be hereinafter called the "usable position." A withdrawing opening 2a is formed between the primary body portion 3 and the secondary body portion 4 so that the mirror assembly 5 can be withdrawn from the storage position to the usable position via the withdrawing opening 2a. More specifically, as shown in FIG. 2, the withdrawing opening 2a is disposed at a substantially central position with respect to the right and left directions of the visor body 2. Additionally, the withdrawing opening 2a is defined between the right and left lower edges 4b of the secondary body portion 4. The right and left lower edges 4b are bent substantially perpendicular to the secondary body portion 4 and contact with the front surface of the primary body portion 3, as shown in FIG. 6. In order to facilitate the operation for withdrawing the mirror assembly from the storage position, a handle 52a is formed on the frame 52 and is configured as a raised portion of the frame 52.

The storage position of the mirror assembly 5 is defined as within the storage space 2b, substantially in the central position of the upper region of the visor body 2. More specifically, the storage position is determined to be proximate to but spaced apart from the bearing 15 and further, not to extend upward beyond the bearing 15. The usable position is determined to be a position within the lower region of the visor body 2, where an eye point 3e defines a substantially central point of the mirror 51 as shown in FIG. 3. The usable position is spaced apart from and located below the bearing 15.

Figure 7:
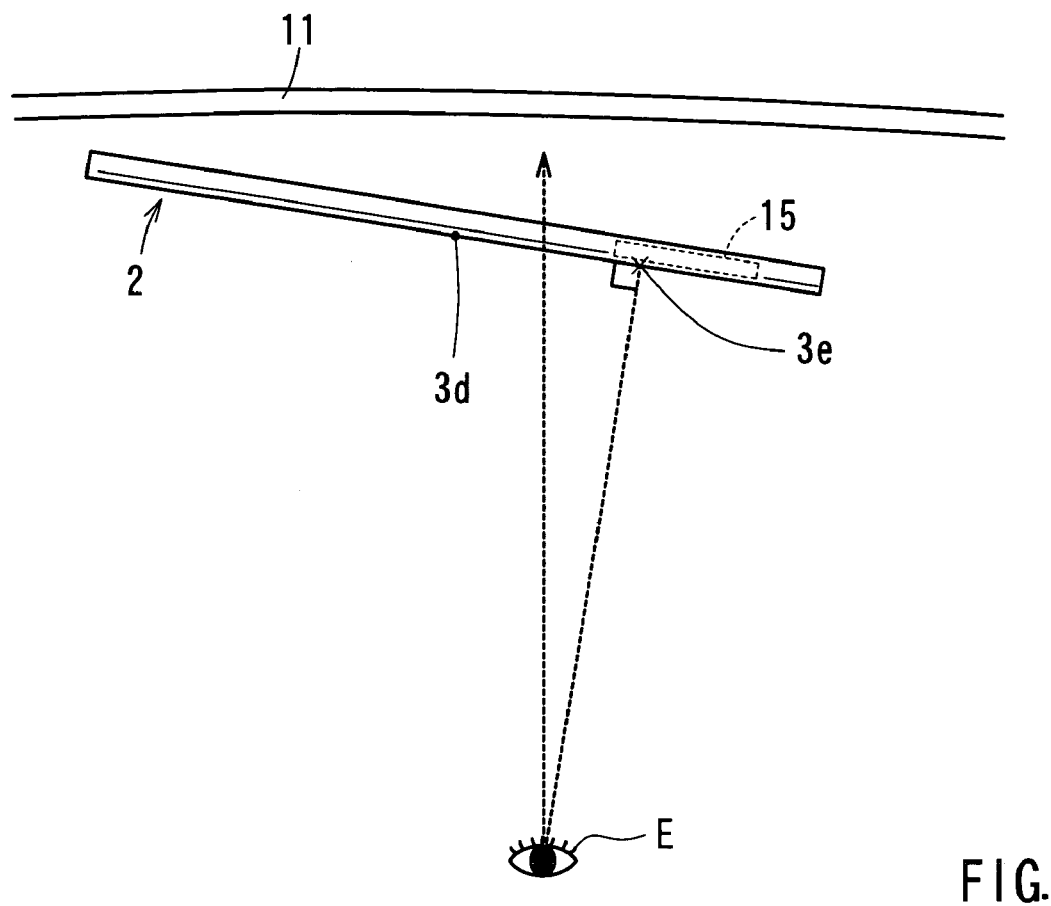
FIG. 7 is a schematic plane view of the vehicle sun visor when the sun visor is in a light-shielding position.

Here, the eye point 3e is a point on the front surface of the visor body 2 or the primary body portion 3, where the sight line of the eyes E of a driver or a passenger intersects essentially perpendicular to the front surface of the visor body 2 when the visor body 2 is positioned at a light-shielding position, as shown in FIG. 7. In general, the visor body 2 in the light-shielding position is inclined by a small angle relative to the surface of the windshield 11 with respect to the right and left directions. Therefore, the eye point 3e is positioned on the right side from a position where the sight line that extends straight forward from the eyes E intersects with the front surface of the visor body 2.

Because the mirror 51 is positioned on the eye point 3e as shown in FIG. 3, the driver or the passenger can see his or her face in the mirror 51 without needing to significantly change the position of his or her head.

Figure 8:
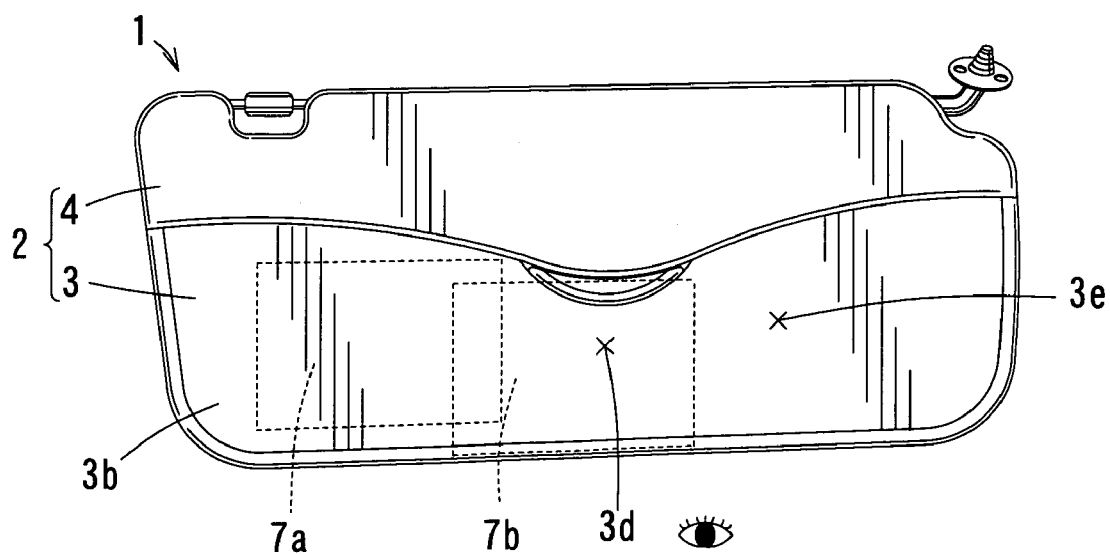
FIG. 8 is a front view of the vehicle sun visor and showing visual recognition regions.

In addition, as shown in FIGS. 7 and 8, a central point 3d of the lower region of the visor body 2 is configured to be positioned on the left side (i.e., or the side away from the bearing 15) of the position where the sight line, which extends straight forwardly from the eyes E, intersects with the front surface of the visor body 2.

Referring to FIG. 2, a positioning device is provided between the mirror assembly 5 and the visor body 2 in order to fix the mirror assembly 5 in a storage position and a usable position. The positioning device includes a ball plunger 6 and two recesses 50a and 50b formed in the rotary shaft 50.

The ball plunger 6 is fixed in position relative to the visor body 2 and has a ball 6a that is biased toward and against the rotary shaft 50 in a diametrical direction. The recesses 50a and 50b are spaced apart from each other along the circumferential direction of the rotary shaft 50. As the mirror assembly 5 pivots, the rotary shaft 50 rotates to change the position of the recesses 50a and 50b. When the mirror assembly 5 has been pivoted to the storage position, the recess 50a opposes the ball 6a. As a result, the ball 6a engages the recess 50a to hold the mirror assembly 5 in the storage position. When the mirror assembly 5 has been pivoted to the usable position, the recess 50b opposes the ball 6a. Consequently, the ball 6a engages the recess 50b to hold the mirror assembly 5 in the usable position. The mirror assembly 5 may be moved from the storage position or the usable position by forcibly pivoting the mirror assembly 5 in order to disengage the ball 6a from the recess 50a or 50b against the biasing force of the ball 6a.

As previously described, the lower region of the visor body 2 has a single layer construction comprising the lower portion of the primary body portion 3. Preferably, a translucent material able to partly inhibit the transmission of light is used to mold the primary body portion 3. Therefore, the entire lower region of the visor body 2 is defined as a sight-through portion 3b through which the driver or the passenger can see forward through and beyond the sun visor.

Because the entire lower region of the visor body 2 is defined as a sight-through portion 3b, the sight-through portion 3b includes a region that extends between the eye point 3e and the central point 3d of the lower region. In addition, the sight-through portion 3b includes recognition regions 7a and 7b. The recognition region 7a may allow visual recognition of a traffic signal when the vehicle turns to the right. The recognition region 7b may allow visual recognition of a traffic signal when the vehicle moves forward. The central point 3d is included in the recognition region 7b.

As described above, according to the first representative embodiment, the bearing 15 is disposed within one of the upper corners of the visor body 2. The lower region of the visor body 2 is defined as the sight-through portion 3b through which the driver or the passenger can see forward. The see-through portion 3b includes and extends between the eye point 3e and the central point 3d of the lower region. The mirror assembly 5 is mounted to the visor body 2 such that the position of the mirror assembly 5 can be changed between the usable position on the eye point 3e and the storage position within the upper region of the visor body 2. In addition, this change in the position of the mirror assembly 5 can be made without interacting with the bearing member 15. Further, the mirror assembly 5 in the usable position and the storage position may not cover the region around the central point 3d.

Further, the effective region of the sight-through portion is a region through which the driver or the passenger can visually recognize traffic signals. The inventor of the present invention has verified that this effective region includes the central point 3d of the lower region of the visor body 2. Because the mirror assembly 5 of the representative embodiment does not significantly cover the central point 3d at any position, such as the usable position or the storage position, the driver or the passenger can easily see the traffic signals at any position of the mirror assembly 5.

In addition, the usable position of the mirror assembly 5 locates the mirror 51 at the eye point 3e. Therefore, the driver or the passenger can see his or her face in the mirror without needing to substantially change the position of his or her head. Further, when the mirror assembly 5 has moved to the storage position within the upper region of the visor body 2, the mirror assembly 5 uncovers the sight-through region 3b at the eye point 3e. Consequently, the sight-through region 3b can be effectively utilized. Furthermore, the mirror assembly 5 does not interact with the bearing 15 during the movement of the mirror assembly 5 when changing positions.

The mirror assembly 5 is pivotally mounted to the visor body 2 (see FIGS. 2 and 3). Because the positioning device for holding the mirror assembly 5 in a usable position and a storage position is provided between the mirror assembly 5 and the visor body 2, the usability of the mirror assembly 5 is improved.

The visor body 2 includes the plate-shaped primary body portion 3 and the plate-shaped secondary body portion 4 that is smaller than the primary body portion 3 in order to cover only the upper part of the primary body portion 3 (see FIGS. 2 and 4 for example). The bearing 15 is disposed between the primary body portion 3 and the secondary body portion 4. Therefore, the lower region of the visor body 2 has a single layer structure configured as the lower part of the primary body portion 3 and is relatively lightweight. The lower lightweight region is positioned away from the support rod 14 because the support rod 14 is mounted within the upper region of the visor body 2. Therefore, the visor body 2 can be pivoted about the support rod 14 through the application of a relatively small force. This enables the operator to easily change the position of the visor body 2, such as removing the visor body 2 from a storage position along the vehicle cabin ceiling 10, as shown by the uppermost double-dashed chain lines in FIG. 1.

The storage space 2b for accommodating the mirror assembly 5 is defined between the primary body portion 3 and the secondary body portion 4 as shown in FIG. 2. The mirror assembly 5 can be moved to a usable position by withdrawing the mirror assembly 5 from the storage space 2b. Therefore, the surface of the mirror 51 can be substantially covered and hidden in the storage position. Thus, the primary body portion 3 and the secondary body portion 4 reliably protect the mirror surface from potential damage.

Because the entire lower region of the visor body 2 is configured as the sight-through portion 3b, the visor body 2 enables uninterrupted visual observation of the landscape and traffic signals that move from right to left or vice verse with respect to the traveling vehicle.

(Second Representative Embodiment)

A second representative embodiment will now be described with reference to FIG. 9. The second representative embodiment is a modification of the first representative embodiment. Therefore, like members are given the same reference numerals as in the first representative embodiment and the description of these elements will not be repeated. The second representative embodiment is different than the first representative embodiment primarily in that the mirror assembly 5 is linearly slidably movable relative to the visor body 2.

Figure 9:
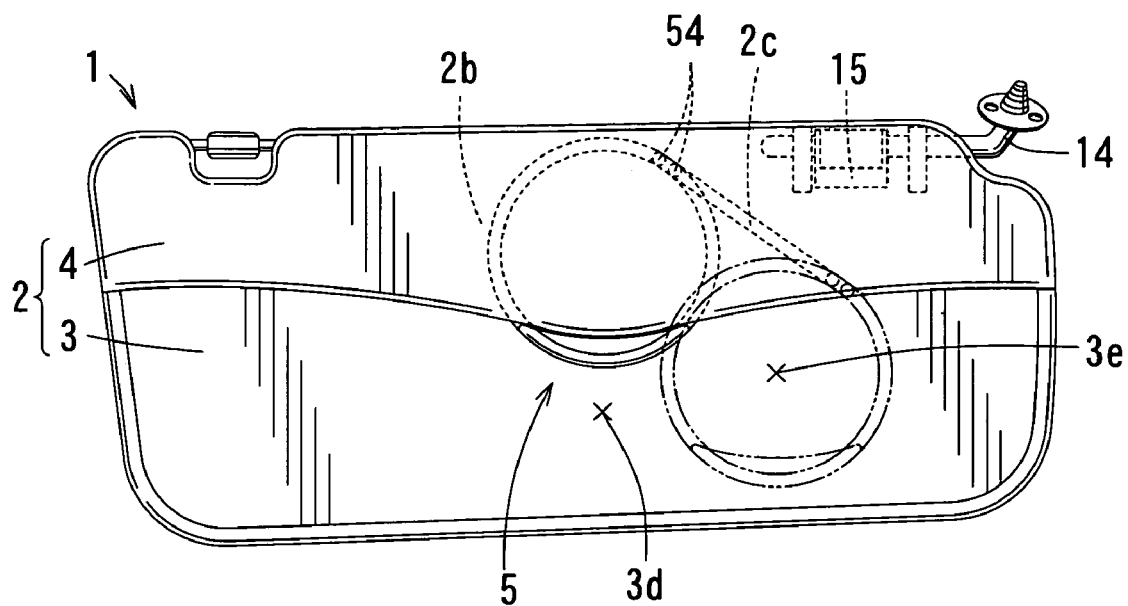
FIG. 9 is a front view of a vehicle sun visor according to a second representative embodiment.

As shown in FIG. 9, a guide rail 2c is disposed between the primary body portion 3 and the secondary body portion 4 and extends obliquely relative to the horizontal pivotal axis of the visor body 2, i.e. the horizontal shaft portion 14b of the support rod 14. A guide portion 54 is formed on the mirror assembly 5 and is slidably movable along the guide rail 2c. As a result, the mirror assembly 5 can move between a usable position on the eye point 3e and a storage position in a substantially central portion of the upper region of the visor body 2 in the same manner as in the first representative embodiment. Also in this representative embodiment, the mirror assembly 5 does not interact with the bearing 15 during the movement between the usable position and the storage region. In addition, the mirror assembly 5 at the usable position and the storage position does not cover the region around the central point 3d of the lower region of the visor body 2.

(Third Representative Embodiment)

A third representative embodiment will now be described with reference to FIG. 10. Also, the third representative embodiment is a modification of the first representative embodiment. Therefore, like members are given the same reference numerals as in the first representative embodiment and the description of these elements will not be repeated. The third representative embodiment is different from the first representative embodiment only in that the mirror assembly 5 can be reversed.

Figure 10:
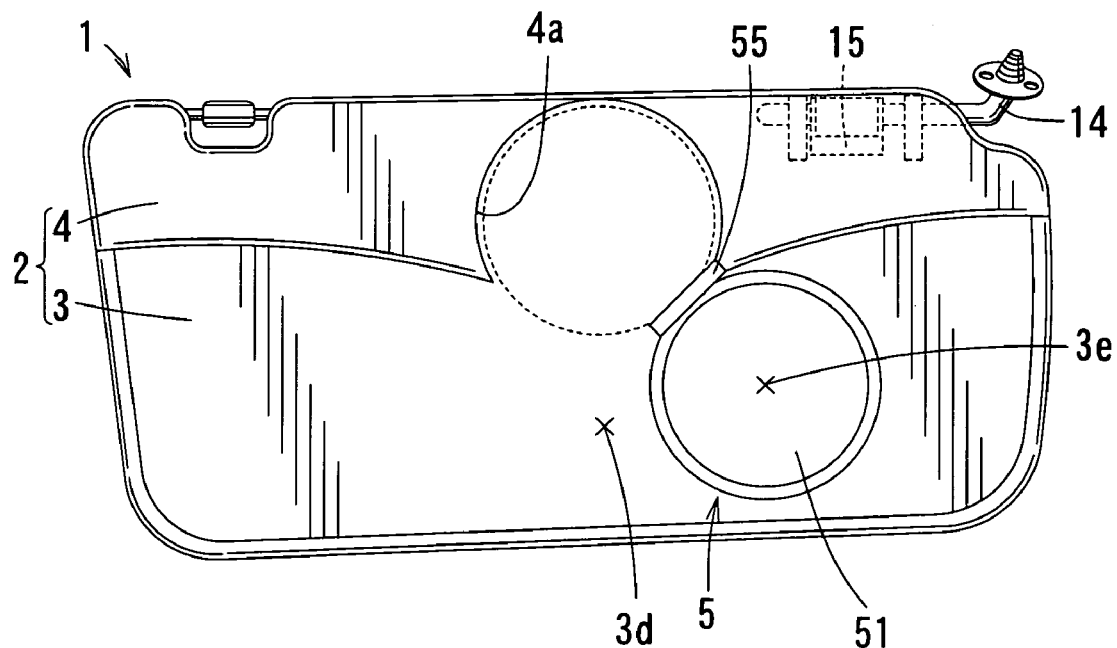
FIG. 10 is a front view of a vehicle sun visor according to a third representative embodiment.

As shown in FIG. 10, the mirror assembly 5 is pivotally mounted to the primary body portion 3 via a hinge 55. This allows the mirror assembly 5 to pivot about the axis of the hinge 55. Alternatively, the mirror assembly 5 may be pivotally mounted to the secondary body portion 4 via the hinge 55. The axis of the hinge 55 is positioned within a plane that is substantially parallel to the surface of the primary body portion 3 and extends obliquely relative to the horizontal pivotal axis of the visor body 2, i.e. the horizontal shaft portion 14b of the support rod 14. A storage recess 4a is formed in the secondary body portion 4 in order to receive the mirror assembly 5 when the mirror assembly 5 is in the storage position, as indicated by the chain line in FIG. 10. Therefore, when the mirror assembly 5 is in the storage position the surface of the mirror 51 faces the surface of the primary body portion 3 (i.e., the surface of the mirror 51 opposes the sun visor body). In order to change the position of the mirror assembly 5 from the storage position to the usable position indicated by solid lines, the mirror assembly 5 may be pivoted about the axis of the hinge 55 and subsequently inverted. Therefore, in the usable position the surface of the mirror 51 faces the interior of the vehicle (i.e., the surface of the mirror 51 faces away from sun visor body).

Also in the third representative embodiment, the mirror assembly 5 in the usable position is positioned on the eye point 3e, while the mirror assembly 5 in the storage position is positioned in a substantially central position of the upper region of the visor body 2. In addition, the mirror assembly 5 does not interact with the bearing 15 during the movement between the usable position and the storage region. Further, the mirror assembly 5 at the usable position and the storage position does not cover the region around the central point 3d of the lower region of the visor body 2.

(Other Possible Embodiments)

The present invention may not be limited to the above representative embodiments but may be modified in various ways as follows:

(1) Although the sight-through portion is defined over the entire lower region of the visor body in the first to third representative embodiments, the sight-though portion may be differently configured as long as the sight-through portion extends over and between the eye point and the central point of the lower region of the visor body.

(2) The primary body portion of the visor body is made of translucent material that partly permits the transmission of light in order to provide a sight-through portion on the lower region of the visor body. However, the primary body portion may be made of material that does not permit transmission of light. In such a case, a plurality of through holes may be formed to extend through the thickness of the lower region of the primary body portion so that the through holes may provide a sight-through portion in the lower region of the visor body.

The invention claimed is:

1. A vehicle sun visor comprising:
   a plate-shaped visor body having an upper region and a lower region; and
   a support rod pivotally supporting the visor body; and
   a mirror assembly mounted to the visor body; and
   a bearing disposed at an upper corner portion of the visor body and rotatably supporting the support rod; and a sight-through portion defined in the lower region of the visor body in order to enable observation through the sight-though portion;

wherein the sight-though portion extends at least between an eye point on the visor body and a central point of the lower region of the visor body; and wherein the eye point is positioned on the lower side of the bearing and is defined as a point on the visor body where a sight line of a vehicle occupant perpendicularly intersects the visor body; and wherein the minor assembly is movable between a usable position and a storage position relative to the visor body; and wherein the usable position is disposed on the eye point; and wherein the storage position is disposed in the upper region of the visor body; and wherein the mirror assembly at the usable position and the storage position does not impede the observation through the central point of the lower region.

2. The vehicle sun visor as in claim 1,
wherein the mirror assembly is pivotally mounted to the visor body; and
wherein the sun visor further comprises a positioning device arranged and constructed to releasably hold the mirror assembly in at least the storage position.

3. The vehicle sun visor as in claim 1,
wherein the visor body comprises a plate-shaped primary body portion and a plate-shaped secondary body portion;
wherein the secondary body portion is configured to cover an upper part of the primary body portion; and
wherein the bearing is disposed between the primary body portion and the secondary body portion.

4. The vehicle sun visor as in claim 3,
wherein a storage space is defined between the primary body portion and the secondary body portion in order to receive the minor assembly in the storage position; and wherein withdrawing the minor assembly from the storage space moves the mirror assembly from the storage position to the usable position.

5. A vehicle sun visor comprising:
a visor body having a sight-through portion;
a mirror assembly mounted to the visor body; and
a storage space defined in the visor body, so that the mirror assembly in the storage position is substantially concealed.
wherein the sight-through portion includes a central point and an eye point displaced apart from each other;
wherein the eye point is defined as a point where a sight line of a vehicle occupant intersects substantially perpendicular to the sight-through portion; and wherein the mirror assembly is movable relative to the visor body between a storage position and a usable position;

wherein the mirror assembly in the storage position is spaced from the eye point and the central position; and wherein the mirror assembly in the usable position is positioned covering the eye point.

6. The vehicle sun visor as in claim 5;
wherein the vehicle sun visor further comprises:
a bearing mounted to the visor body; and
a support rod rotatably mounted to the bearing, so that the visor body can pivot about the support rod; and
wherein a path of movement of the mirror assembly between the storage position and the usable position is determined such that the mirror assembly does not interact with the bearing.

7. The vehicle sun visor as in claim 6;
wherein the bearing is position one side of the visor body along a direction of the support rod; and
wherein the eye point is position on the same side as the bearing with respect to the central point.

8. The vehicle sun visor as in claim 5;
wherein the visor body comprises a substantially opaque upper portion defining the storage space and a lower portion comprising the sight-through portion.

9. The vehicle sun visor as in claim 6,
wherein the sight-through portion extends substantially within a first plane; and
wherein the mirror assembly moves within a second plane substantially parallel to the first plane.

10. The vehicle sun visor as in claim 9,
wherein the mirror assembly is pivotally mounted to the visor body about an axis that is substantially perpendicular to the second plane.

11. The vehicle sun visor as in claim 9,
wherein the visor body further includes a guide rail, so that the mirror assembly moves along the guide rail.

12. The vehicle sun visor as in claim 6.
wherein the sight-through portion extends substantially within a first plane; and
wherein the mirror assembly is pivotally mounted to the visor body about an axis that is substantially parallel to the first plane.

13. The vehicle sun visor as in claim 12,
wherein the minor assembly has a mirror defining a mirror surface,
wherein the mirror surface opposes the visor body in the storage position, and
wherein the mirror surface faces away from the visor body in the usable position.

* * * * *